US009308141B2

(12) United States Patent
Blackwell et al.

(10) Patent No.: US 9,308,141 B2
(45) Date of Patent: Apr. 12, 2016

(54) MOBILE TREATMENT, DIAGNOSTIC AND MINOR SURGERY FACILITY

(71) Applicant: Med1 Partners, LLC, Bethesda, MD (US)

(72) Inventors: Thomas H. Blackwell, Piedmont, SC (US); Timothy J. Masud, Concord, NC (US); Jeffrey D. Fischer, Washington, DC (US)

(73) Assignee: Med1 Partners, LLC, Bethesda, MD (US)

( * ) Notice: Subject to any disclaimer, the term of this patent is extended or adjusted under 35 U.S.C. 154(b) by 0 days.

(21) Appl. No.: 14/272,552

(22) Filed: May 8, 2014

(65) Prior Publication Data

US 2014/0246876 A1    Sep. 4, 2014

Related U.S. Application Data

(63) Continuation of application No. 13/681,454, filed on Nov. 20, 2012, now Pat. No. 8,733,813.

(60) Provisional application No. 61/588,814, filed on Jan. 20, 2012, provisional application No. 61/561,963, filed on Nov. 21, 2011.

(51) Int. Cl.

| | |
|---|---|
| *B60P 3/14* | (2006.01) |
| *A61G 3/00* | (2006.01) |
| *A61G 10/00* | (2006.01) |
| *E04H 3/08* | (2006.01) |
| *B60P 3/34* | (2006.01) |
| *A61G 3/06* | (2006.01) |
| *E04B 1/343* | (2006.01) |

(52) U.S. Cl.
CPC ................ *A61G 3/001* (2013.01); *A61G 10/00* (2013.01); *B60P 3/14* (2013.01); *B60P 3/34* (2013.01); *E04H 3/08* (2013.01); *A61G 3/061* (2013.01); *A61G 2203/12* (2013.01); *E04B 1/34305* (2013.01)

(58) Field of Classification Search
CPC  A61B 3/061; A61B 2203/12; E04B 1/34305; A61G 3/001; A61G 10/00; B60P 3/14; B60P 3/34; E04H 3/08
See application file for complete search history.

(56) References Cited

U.S. PATENT DOCUMENTS

| | | | | |
|---|---|---|---|---|
| 4,915,435 | A | * | 4/1990 | Levine ....................... 296/24.38 |
| 5,092,650 | A | * | 3/1992 | Perlot .......................... 296/164 |
| 5,398,986 | A | * | 3/1995 | Koob ......................... 296/24.38 |
| 6,082,799 | A | * | 7/2000 | Marek ........................ 296/24.38 |
| 6,179,358 | B1 | * | 1/2001 | Hirayama et al. .......... 296/24.38 |
| 6,692,062 | B1 | * | 2/2004 | Woodard et al. ............. 296/164 |

(Continued)

OTHER PUBLICATIONS

PCT Search Report for PCT/US2012/65988, dated Feb. 11, 2013.

*Primary Examiner* — Lori L Lyjak
(74) *Attorney, Agent, or Firm* — Remenick PLLC

(57) ABSTRACT

The invention is directed to a mobile medical facility capable of treating, diagnosing and performing minor surgery on multiple patients at one time. In general, the facility includes a health care area which is interchangeable between a first transportable configuration and a second, operational configuration. In the operational configuration, the health care area is expanded and capable of providing general care or diagnostic facilities to multiple patients as well as registration, counseling and triage to at least one patient. Preferable a row of patient treatment bays are provided with intake, counseling and triage cubicles and storage areas.

20 Claims, 10 Drawing Sheets

(56) References Cited

U.S. PATENT DOCUMENTS

| | | |
|---|---|---|
| 7,300,086 B2 * | 11/2007 | MacLean .................. 296/26.13 |
| 7,347,472 B2 * | 3/2008 | Pellegrin, Jr. ............. 296/24.38 |
| 7,540,546 B2 | 6/2009 | Kern et al. |
| 7,794,001 B2 | 9/2010 | Blackwell et al. |
| 8,511,741 B2 * | 8/2013 | Engelbrecht et al. ......... 296/156 |
| 9,057,198 B2 * | 6/2015 | Beland et al. |

* cited by examiner

MOBILE TREATMENT, DIAGNOSTIC AND MINOR SURGERY FACILITY

REFERENCE TO RELATED APPLICATIONS

This application is a continuation of U.S. application Ser. No. 13,681,454 filed Nov. 20, 2012, which issued as U.S. Pat. No. 8,733,813 on May 27, 2014, and claims priority to U.S. Provisional Application No. 61/588,814 filed Jan. 20, 2012, and U.S. Provisional Application No. 61/561,963 filed Nov. 21, 2011, all of the same title and each of which is incorporated by reference in its entirety.

BACKGROUND

1. Field of the Invention

A mobile treatment, diagnostic and minor surgical procedure unit and methods are described. In particular, the unit and methods facilitate the diagnosis, treatment, study of epidemiological significance of particular symptoms, diseases or illnesses within a population as well as the delivery of primary care, analytic testing, and services to communities and people and isolated populations in need.

2. Description of the Background

Delivery of primary care is an important component of public health care, especially in developing countries or other areas where access to medical services is challenging or prohibitive. Primary care is typically a point of first contact when it comes to the health of a particular individual or population. This type of consultation addresses the widest scope of health care by including patients of all ages and a variety of health care needs. Thus, primary care is often the basis of an effective health care system.

Within the context of primary care, there can be epidemiological concerns and vice versa. For example, studying the nature, time and duration of symptoms, signs, illnesses as well as treatments and diagnoses from a community or population perspective is often crucial for understanding the clinical significance of risk factors in the community, the absolute risk associated with interventions or risk factors, and the efficient targeting of preventive and other resources. Further, tailored advice can be provided to individual patients/families during the consultation. Changes in the shape of primary care, and the range of symptoms and illnesses managed by different members of the primary health care team, can influence understanding of: the epidemiology of disease in the community; the need for different health care services; and how epidemiology is performed.

Typically, temporary fixed medical facilities are established for disaster medical care, e.g., in the event of a natural disaster or an epidemic outbreak in a given geographic region, or to augment existing health care structures at times of building infrastructure or performing renovations. The effectiveness of any temporary medical facility is dependent on the readiness and rapidity with which such assets are prepared to evaluate patients once established. The appropriate equipment for the deployment mission, ease of use, and staff to provide care is all equally important considerations. While fixed, static structures, such as hospitals and clinics, are essential to communities; locations for such structures are typically reserved for the most populated areas. This situation is clearly not beneficial for those living outside this service area or in remote locations. In countries where travel is on foot, these challenges to health and medical care resources are especially problematic.

In light of this dilemma, providing a portable medical facility that can reinforce or augment the existing local medical facilities and provide basic medical services and care would be advantageous according to the present invention described below. In particular, such facilities can be important in diagnostics, specifically, understanding disease spread and epidemiological surveillance. Targeting certain diseases and establishing definitive diagnoses increases the likelihood that accurate treatment options are known and available earlier in the course of a particular illness or outbreak of illness, thus increasing the potential for positive outcomes.

SUMMARY OF THE INVENTION

In general, the invention is directed to a mobile treatment, diagnostic, and minor surgery unit adapted to treat, diagnose, or operate on a plurality of patients and adapted to be transported, including: a health care area including a floor area and adapted to interchange between at least a first transport configuration and a second operational configuration, wherein in the first configuration the floor area of the health care area is reduced compared to the second configuration to allow for transport of the health care area, and wherein in the second configuration the health care area supports a first medical treatment, diagnostic, and minor surgical procedure patient area configured to provide general care or diagnosis facilities to a plurality of patients and a second patient area configured to provide registration, counseling, or triage to a least one patient.

In one embodiment, the mobile treatment, diagnostic and minor surgery unit, the health care area includes one slide out area that is adapted to expand and contract the health care floor area.

In another embodiment, the mobile treatment, diagnostic and minor surgery unit when in the second configuration, the first medical treatment, diagnostic and minor surgical procedure patient area includes a single row of a plurality of patient treatment bays.

In another embodiment, each patient treatment bay includes either a patient bed or chair and, in the second configuration, the second patient area includes at least one cubicle designed for registration, counseling, or triage.

In another embodiment, the health care area of the mobile treatment, diagnostic and minor surgery unit is at most about 80 percent of the maximum size limit allowed to be transported over interstate roadways in the United States.

In another embodiment, the health care area is at most 75 percent of the maximum size limit allowed, in yet other embodiments at most 70 percent of the maximum size limit allowed and in yet still other embodiments, at most 65 percent of the maximum size limit allowed.

In another embodiment, the mobile treatment, diagnostic and minor surgery unit further includes a transport system for moving the unit.

In another embodiment, the mobile treatment, diagnostic and minor surgery unit further includes an awning system configured to be deployed to provide an extended patient care work environment adjacent to one or both sides of the health care area.

In another embodiment, the mobile treatment, diagnostic and minor surgery unit further includes: a generator sized and dimensioned to provide power to the mobile unit; and an air filtration system sufficient to repeatedly filter an air supply to the unit when deployed in the operational configuration, wherein the air filtration system maintains the air pressure inside the unit at a higher level than the air pressure outside the unit to at least minimize contamination in the unit.

In another embodiment, the mobile treatment, diagnostic and minor surgery unit further includes at least one heating source to provide heat to the mobile unit and at least one air conditioning source to cool the unit.

In another embodiment, the floor area in the second configuration of the mobile treatment, diagnostic, and minor surgery unit is at least twice as large as the floor area in the first configuration.

The invention further encompasses a mobile treatment, diagnostic and minor surgery facility adapted to be transported over any region that is accessible by truck, four wheel drive or all-terrain vehicle. Preferably the facility is vehicle, the vehicle chassis or the trailer of a big-rig truck and not connected to a vehicle with a hitch or other tow bar. Vehicles of the invention travel on all manner of paved and unpaved roads including but not limited to U.S. interstate, non-U.S. and local roads and freeways, fire access roads in wooded areas, dirt paths, frozen rivers, swamps and bodies of water, gravel roads, ice roads, jungle paths, sand roads, pastures, salt flats, open desert, and any terrain that is accessible by an all-terrain or four wheel drive vehicle. The facility provides treatment for a plurality of patients suffering from a range of conditions or injuries including: a health care area having one slide out portion, a first transportable configuration defined by a contracted position of the slide out portion; a second operational configuration defined by an expanded position of the slide out portion; a first patient treatment area defined at least partially by the slide out that, when in the second configuration, is configured to provide general care to a plurality of patients and that includes a single row of a plurality of patient treatment bays; and a second patient area at least partially defined by the slide out that, in the second configuration, is adapted to provide registration, counseling, or triage to at least one patient, wherein the slide out portion has a floor area in the second configuration that is at least twice a floor area when the slide out portion is in the first configuration.

In another embodiment, the mobile treatment, diagnostic and minor surgery facility further includes a fixed awning system that extends outward from the health care area in at least one direction when the health care area is in the second, operational configuration, and provides an extended patient care work environment adjacent to the health care area.

In another embodiment, the fixed awning system expands the capabilities of the facility to encompass one or more hospital litters, one or more supply carts, a light source, and an electric source configured to extend one or more of the medical or diagnostic capabilities of the mobile facility, or both, outside of the health care area. In further embodiments, the single row of the plurality of patient treatment bays includes at most six patient treatment bays and the second area includes at least two cubicles for registration, counseling, or triage of patients, when the mobile unit is in the second, operational configuration.

In another embodiment, the health care area includes a partition between the first patient treatment area and the second registration, counseling, or triage patient area to facilitate control of movement between the first and second areas.

The invention further encompasses a method for providing medical care to a plurality of patients in a remote location including: transporting a first health care area in a first transportable configuration from a first location to a second remote location, wherein in the first configuration the first health care area defines a first floor area and facilitates the transport of the first health care area over one or more roadways; expanding a slide out of the health care area to expand the health care area into a second operational configuration, wherein second configuration of the health care area defines a second floor area greater than the first floor area adapted to diagnose, treat, and perform minor surgery or first aid on a plurality of patients; providing a first medical treatment, diagnostic, and minor surgical procedure patient area defined at least partially by the slide out within the second floor area; and providing a second patient area defined at least partially within the second floor area having at least one region that is for registration, counseling, or triage.

In another embodiment, the method further includes contracting the slide out of the health care area to place the health care area back into a first configuration for transport. In still other embodiments, the method includes providing one or more separators for dividing each of the treatment bays for privacy therein.

In another embodiment, the method includes operably associating an extendable awning system with the health care area to increase the medical or diagnostic capability of the health care area, or both. In some embodiments, the second patient area includes at least one of a table, a chair, and triage equipment.

Other embodiments and advantages of the invention are set forth in part in the description, which follows, and in part, may be obvious from this description, or may be learned from the practice of the invention.

DESCRIPTION OF THE INVENTION

Figure 1:
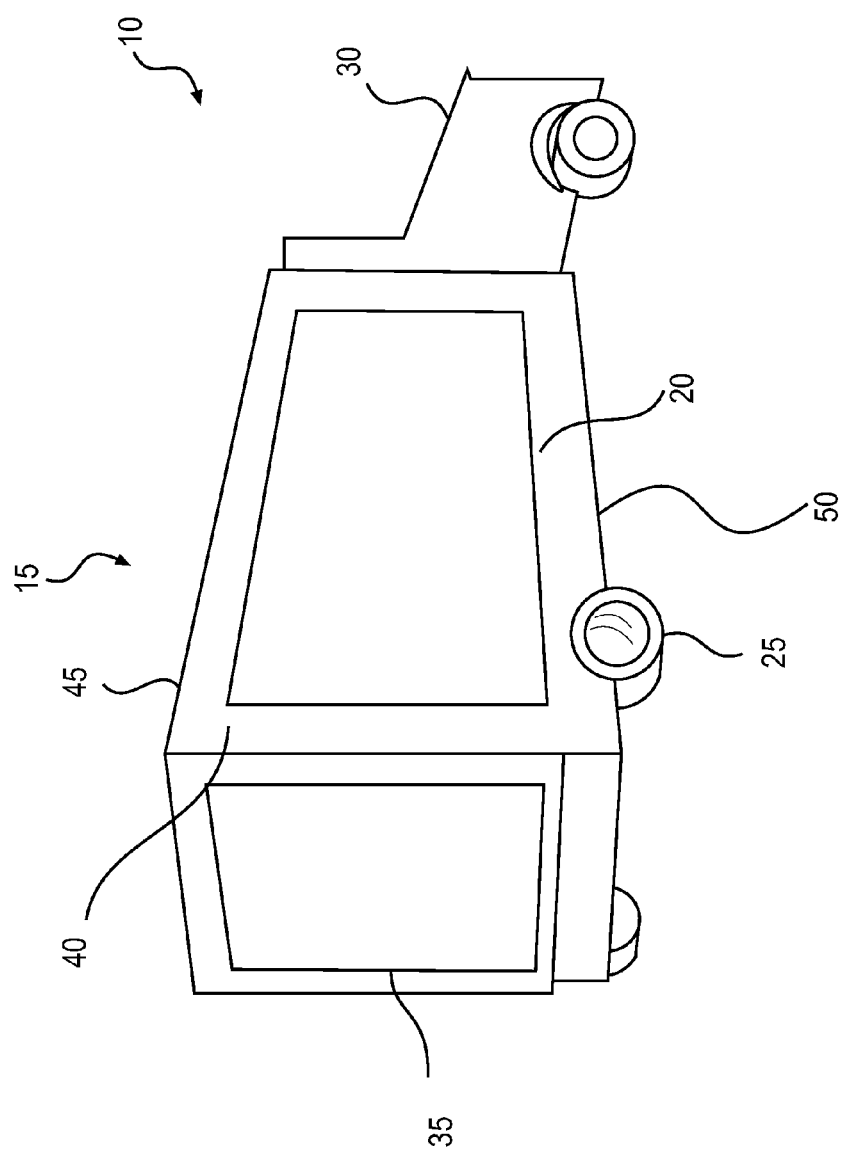
FIG. 1 illustrates a perspective view of one embodiment of the present invention, wherein the health care area is in a first configuration for transport to a location.

The invention is directed to mobile treatment, diagnostic and minor surgical procedure facilities, and also, methods to facilitate the diagnosis, treatment, study of epidemiological significance of particular symptoms, diseases or illnesses within a population as well as the delivery of primary care, analytic testing, and services to communities and people and isolated populations in need. Preferably the facility provides acute care to patients and populations and can be deployed quickly, efficiently and cost effectively as compared to fixed structures even when transported by truck or another vehicle. The mobile treatment, diagnostic and minor surgery unit, also referred to as "unit" or "facility," and methods described herein facilitate transport of general and/or primary care, diagnostic and minor surgical equipment and services to locations that are in need thereof. Treatment includes care provided to a patient for any diagnostic or preventative procedure or disorder who may be ill and presenting symptoms or be symptomless, including, but not limited to palliative care, such as treating a chronic condition or one or more symptoms thereof, essential medical care, such as that which would be life-saving, and non-essential medical care, such as treatment of angina or other quality of life concerns. Diagnosis can be the identification of the cause of any particular malady, and can include basic laboratory testing such as identifying a patient with diabetes by blood testing, or molecular analysis, e.g., nucleic acid analysis of an influenza infected patient to confirm diagnosis or obtain more specific strain or other information. In such locations, mobile health assets can advantageously improve wellness and facilitate prevention strategies and can drastically improve the quality of life for a population. The mobile unit described herein is adapted to permit treatment of numerous patients and have a high through-put of patients as compared to what is otherwise available in the area, if anything. Preferably the mobile facility is not towed but self-propelled with an engine which is preferably powered with gasoline, jet or aircraft fuel, diesel or bio-diesel fuel, ethanol, electric battery power, compressed natural gas or a hybrid thereof. As such, the facility is easily transported over conventional interstate highways, roads, unimproved roads such as, for example with off-road modifications (e.g., all-wheel drive, four-wheel drive, individual or single wheel drive, Humvee), or transported by air or sea without requiring unusual or extensive transporting expense or effort even when transporting the mobile unit to a remote location, such as a rural location or an underdeveloped country or region. Accordingly, the facility may possess, for example, wheels for travel cross roads, skis for travel across snow and ice and possibly sand, a hull for travel across water, or tracks for travel across rough terrain.

In particular, the invention encompasses health care areas 15 that are sized and dimensioned to be smaller than a semitrailer so as to fit on such a smaller vehicle and therefore be more readily transportable off-road and to other remote locations in need of such a mobile healthcare unit. In such embodiments, the mobile facility can be delivered and deposited at a location, and the cab recovered or simply used elsewhere. When the desired mission of the facility is completed, the facility can be simply and easily re-connected to a cab and again transported to a new location. Because transportation is so easy, the facility can also be brought to a convenient location for cleaning, replenishment of supplies (as opposed to supplies having to be delivered to the facility), refurbishment of furniture or equipment, or for any reason. Also in such embodiments, the mobile facility can be constructed at a particular remote site, for example, by air drop or ship delivery of unit parts that are constructed and the constructed vehicle driven away. By allowing for unit construction on site, problems associated with transport over undesirable areas can be eliminated and/or the mobile facility can be constructed for the specific transportation needs required without component parts that are not necessary for transport in the target or designated area. Vehicle wheel suspension is preferably independent and utilizes designs encompassing non-Newtonian fluids. Preferably the walls of the mobile facility are composed of a material that is lighter in weight than iron or steel, such as aluminum, carbon fiber or another weather resilient and relatively inert material. Also preferably, the exterior walls of the facility are insulated sufficiently to maintain an interior temperature that is suitable for treatment of the patients and protective from weather, such as wind, lightning, water and temperatures that are considered hot or cold as compared to ambient.

Preferably, and when necessary, the mobile facility possesses all of the required accessories, features and/or attributes to be registerable for travel across roads of the country or region of interest. Also preferably the mobile facility contains a sleeper cab for the driver and/or additional passenger to rest when extended travel times make rest or travel breaks necessary or desired.

In general, and as shown in FIG. 1, the unit 10 includes a health care area 15 and an operationally associated transport system 30. The health care area 15 includes most, if not all, of the treatment, diagnostic and minor surgical equipment. The transport system 30 may be associated with the health care area 15 by any means known to one of ordinary skill in the art. For example, the transport system 30 may be a truck, cab or tractor that is coupled to the health care area by a number of mechanisms, such as by use of hitch, hook and lock mechanisms, converter gear, etc. In this preferred embodiment, the transport system 30 may reversibly coupled to the health care area 15 so that the health care area can be delivered to an area in need. The transport system 30 may additionally provide energy and air to the health care area 15 through air and electric lines. In an additional embodiment, the transport system 30 may be directly attach to the health care area 15, so that the transport system 30 and the health care area form one unified structure, such as a large van. Both the transport system 30 and the health care area typically have wheels 25 to allow for ease of transport over roadways, although the health care area 15 can be outfitted to be transported easily via transport vehicles over air and water as well, such as is typical in the transport of storage containers.

The health care area contains various pieces of electrically powered equipment that are connected to a power source such as an alternator coupled to the engine of the vehicle or, preferably, by a generator coupled to a fuel supply such as, but not limited to, propane, natural gas, diesel fuel, ethanol, gasoline, or combinations thereof. The power source may be used to run the electrical equipment within the facility (e.g., medical equipment, air filtration system, air conditioning, heating, lighting, water pumps, etc.), to provide power to external connections, and to power the vehicle itself, such as expandable portions of the facility (e.g., awning, flooring, walls) and/or the vehicle engine or another engine.

Preferably, the floor area created by the expanded configuration is at least 25% greater and, more preferably, at least 50% greater than the floor area of the contracted configuration. Also, preferred is a floor area in the expanded configuration that is at least 75% greater, at least 100% greater, at least 125% greater, at least 150% greater, at least 175% greater and 200% greater or more than the floor area of the contracted configuration. Also preferred is an expanded configuration that provides more than expanded floor area, but also increased the work area such as, for example, by providing increased working area (e.g., chairs, desks, beds, benches, shelves) at multiple levels in the expanded configuration.

Figure 2:
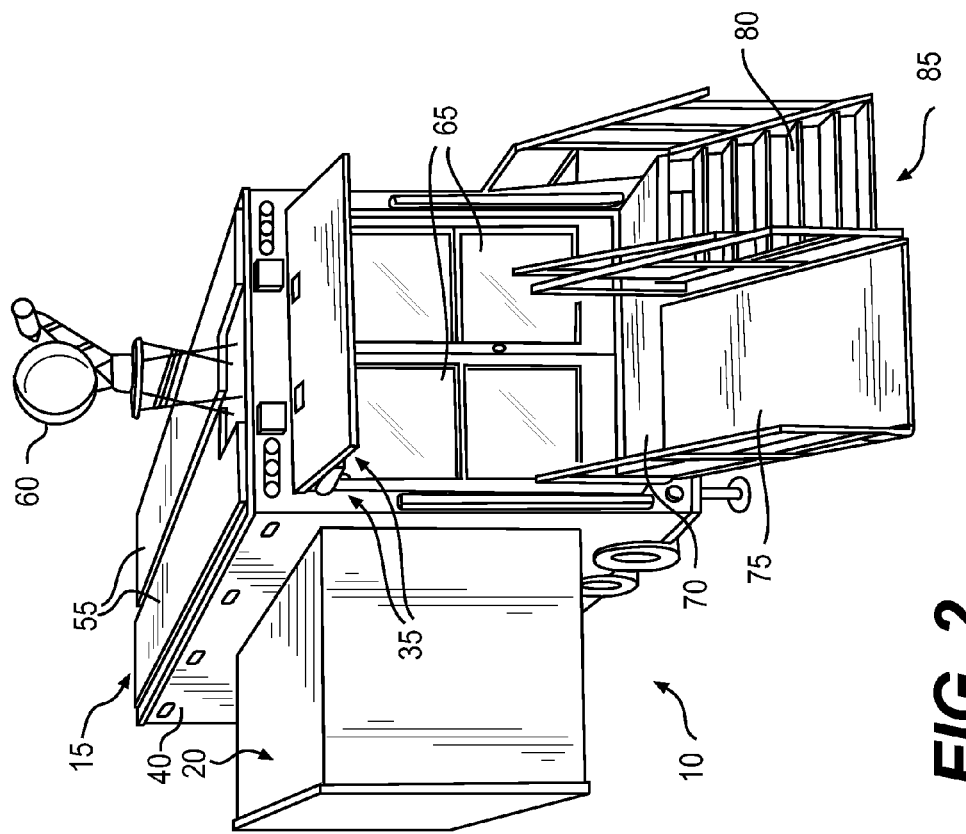
FIG. 2 illustrates a perspective view of one embodiment of the present invention wherein the health care area is in a second operational configuration.

As shown in FIGS. 1 and 2, the health care area 15 has at least a first and second configuration. This is accomplished by the use of at least one slide out 20, and preferably only one slide out 20. The slide out 20 is able to reversibly expand and contract in size and has more than one position to allow for the different configurations of the treatment and diagnostic regions within the health care area 15. In the first configuration, the floor area of the health care area 15 is typically reduced to a size that allows for the transporting of the facility such as a trailer over, for example, public highways and pathways, as the second configuration is often too large to fit in a standard-sized interstate vehicle or container. In fact, in a preferred set of embodiments, the first configuration is sufficiently small that it can readily fit in vehicle smaller and preferably at least substantially smaller, than a semi-trailer-sized vehicle for interstate travel. In the second configuration, the floor area of the health care area 15 is expanded and large enough to support a plurality of beds for treating or diagnosing patients, and an area for registration, counseling, or triaging of patients. For example, the treatment area may have up to six beds when the slide out 20 is in an expanded position. In some embodiments, the floor area in the second configuration may be larger than the floor area in the first configuration, preferably the floor area of the health care area 15 in the second, expanded configuration is at least twice the size of the floor area of the health care area 15 in the first, contracted configuration.

Preferably there exist multiple expanded configurations for any or all expanded areas (e.g. awning, walls, ceilings, floors) such that expansion from the contracted configuration can be incremental allowing for expansion to a size or area that accommodates to the surroundings. With incremental expansion, there can be a first expanded configuration, a second further expanded configuration, a third still further expanded configuration, and so on as desired wherein each incremental expansion can be functional and utilized. Each incremental expansion is preferably locked in place before use. Similarly, there may be a first, a second, a third, and so on contracted configurations.

Preferably, patients are serviced in the expanded configuration and the contracted configuration is for transportation and contains no patients or other health care providers. A contracted configuration that maintains a small number of patients and/or health care workers during transportation is also preferred.

In general, the health care area 15 may be of any shape compatible with its treatment, diagnostic or minor surgical function but preferably, in the first configuration the shape of the health care area 15 is generally rectangular and includes side walls 40, a roof surface 45, a back surface 35 and an undersurface 50. The back surface 35 may include at least one door 65 for entry into the health care area 15, or alternatively may include an additional slide out for expansion of the health care area 15. Preferably the facility possesses 2, 3, 4, 5, 6, 7, 8, 9 or 10 or more beds, recovery rooms or suites (or more), which may be individually configured as private or semi-private, for temporary or overnight patients, or a number of beds as determined by the structure and lay out of the facility. Although the mobile facility can be parked and immediately utilized, alternatively the mobile unit may be connected securely to the ground or another object or objects for stability. Preferably, all connections are reversible such that connections can be unsecured and the mobile facility moved to a new location as desired.

Figure 3:
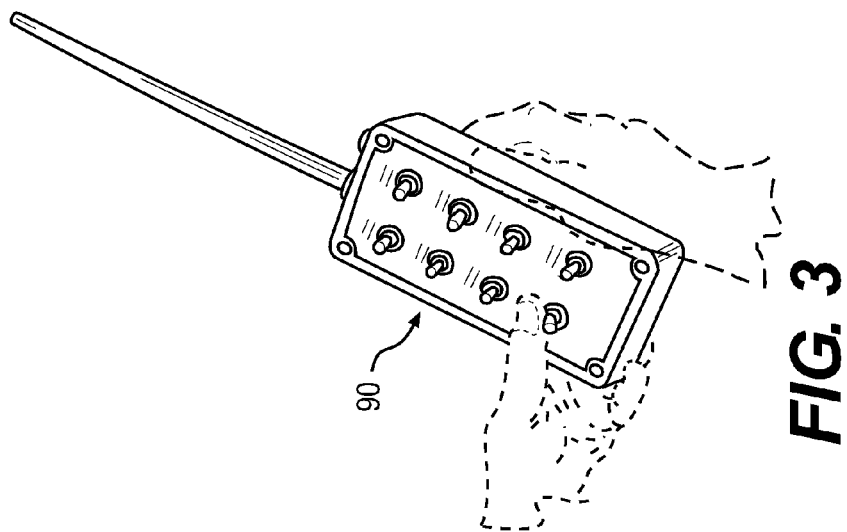
FIG. 3 illustrates a perspective view of one embodiment of a remote control device for moving the health care area between the first and second configurations.

In one embodiment, the slide out 20 emerges from the side wall 40 when the health care area 15 is expanding into the second configuration. This may be controlled by remote control 90 as is shown in FIG. 3. While in the first configuration, the health care area 15 may generally be of any size but is preferably sized to fit on common roadways while in transport. Preferably, and advantageously for smaller roadways, the size of the health care area 15 in the first configuration is reduced as compared to the maximum transport size allowed on roadways. For example, and not by way of limitation, the health care area 15 may be 80 percent of the maximum size limit allowed to be transported over interstate roadways in the United States as determined by the Department of Transportation in most instances. In other embodiments, the health care area is at most 75 percent of the maximum size limit allowed, in yet other embodiments at most 70 percent of the maximum size limit allowed and in yet still other embodiments, at most 65 percent of the maximum size limit allowed. For example, on interstates in the U.S., the maximum size allowed is about 102 inches (2.6 m) wide, 13.5 feet (4.1 in) feet in height, and 80,000 pounds (36,000 kg) gross weight. Preferably, the transport system and health care area are sized to fit in a truck that is shorter than a semi-trailer truck, preferably in a standard-sized truck, including but not limited to sizes in length of about: 10 feet, 14 feet, 16 feet, 17 feet, 20 feet, 24 feet, 26 feet, 30 feet, 35 feet, or the like, or any size there between. Also preferred is a system that involves multiple trailers with different purposes such as, for example, a first trailer that serves as a preparatory room for minor surgical procedures, examinations, and/or discussions, and a second trailer for more involved procedures and a third containing recovery beds or suites as needed, which may be 1, 2, 3, 4, 5, 6 or more. Trailers may also contain both surgical and recovery beds in the same vehicle.

In the second, expanded configuration, the health care area 15 is expanded and provides additional floor area capable of supporting a plurality of patient treatment bays 95 and a plurality of cubicle areas 100 for registration, counseling or triage of patients. The health care area 15 is expanded by the use of one or more slide outs 20. In a preferred embodiment, the health care area 15 has one slide out.

The health care area 15 may include one or more doors for entering and leaving. For example, the back surface 35 of the health care area 15 may define one or more doors 65 and serve as a main entrance 85. A ramp 75 and/or stairs 80 may be transported with the health care area 15 and used to assist people in reaching the main entrance 85. In addition, a hydraulic lift 70 may be transported with and attached to the back surface 35 of the health care area 15 to assist in transporting equipment into and out of the health care area 15. Additional or alternative zones for ingress or egress may also be present, e.g., on the sides of the health care area.

The health care area 15 may further include a satellite communication system 60 for the unit 10. The satellite communication system 60 may provide real-time video and audio communications between the unit 10 and other health or governmental agencies such as emergency centers. The satellite communication system 60 can also allow for internet capabilities as well as the transport of information, preferably encrypted to comply with governmental regulations regarding such private information, such as medical records to and from the unit 10. Telemedicine capabilities, such as videoconferencing, can also be provided for by using the satellite communication system 60.

When the slide out 20 is fully extended, it in part defines a first patient area adapted to diagnose, treat and/or perform minor surgery or first aid on a plurality of patients concurrently or sequentially, as well as a second patient area for registering, counseling or performing triage on at least one patient. The first patient area includes the medical and/or diagnostic equipment for addressing, treating, or diagnosing a wide range of conditions or injuries including, but not limited to, minor operative procedures, defined as those not requiring general anesthesia or deep sedation such as skin lesion biopsy, wound repair, abscess incision and drainage, and circumcision.

Figure 4:
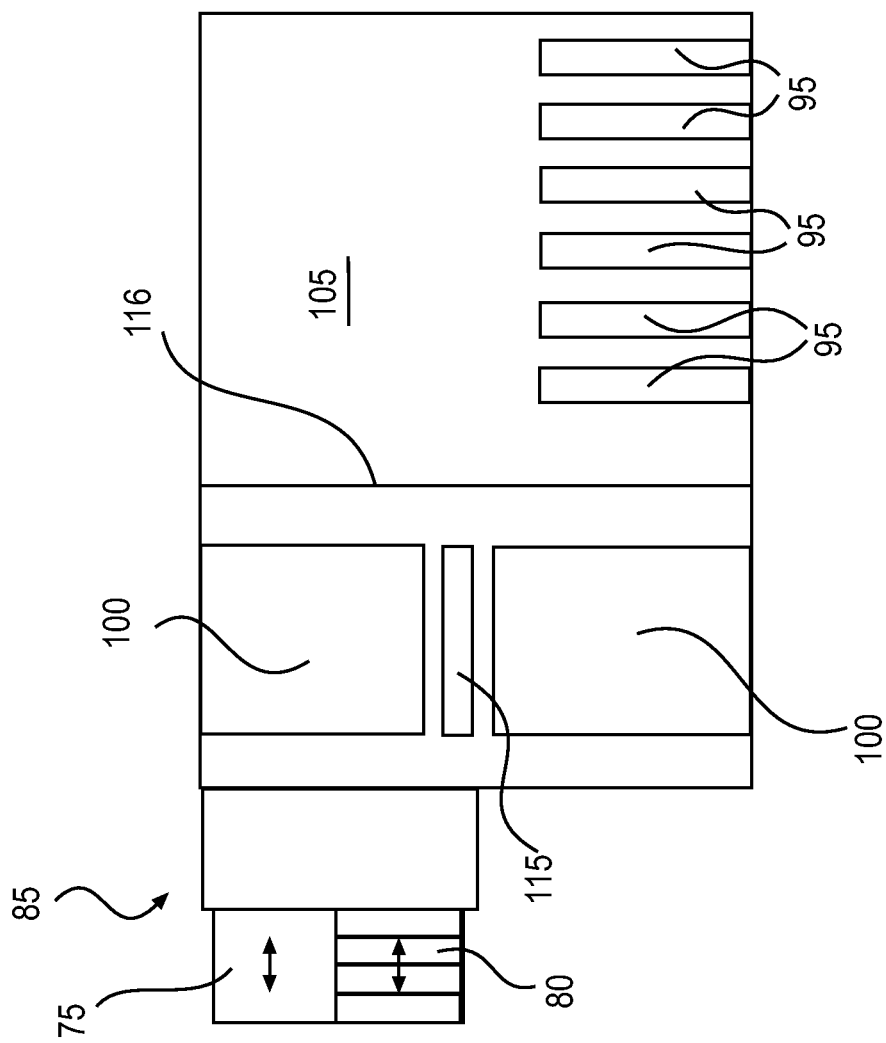
FIG. 4 illustrates a view one embodiment of the invention from the interior of the health care area from the top wherein the health care area is in a second operational configuration.

As shown in FIG. 4, the first patient area provides for a plurality of patient treatment bays 95. At most, six patient treatment bays 95 are provided for within the health care area 15. In some instances, six, five, four, three, two or even one patient treatment bay 95 is provided. Some of the patient bays 95 may be designated for diagnostic sampling, treatment or minor surgical procedures. Alternatively, bays may be designated or used for multiple purposes, e.g., diagnosis and treatment, or diagnosis and surgery, or even all three purposes. Each patient bay 95 may include a patient bed, chair or hospital litter, and additional medical or diagnostic equipment. Such equipment can include typical supplies found within a general practitioner's office, such as sample collection equipment, pressure cuffs, thermometers, etc. as well as equipment found within an analysis laboratory, such as polymerase chain reaction machines, hot water baths, culturing equipment, test strips, medical workstation, and the like. Thus, medical personnel may be able to diagnose an ongoing infectious epidemic within a population without having to send samples away from the mobile unit 10. Patient beds may be typical of those found in medical offices. The patient treatment bays 95 may be divided for privacy by the use of partitions, such as walls, curtains, screens, pull-down shades, or the like. The second patient area may provide one or more cubicles 100 for the registration, counseling or triage of one or more patients. As shown in FIG. 4, two cubicles 100 and six patient treatment bays are a preferred embodiment, although one in the art would appreciate that numerous variations the present invention may be employed regarding the number, combination and designation of the patient treatment bays 95 and the cubicles 100. Each cubicle 100 may include chairs, a desk and/or additional equipment including that discussed herein. Thus, typically patients will be registered and evaluated as to the severity of their condition within the context of the second patient area. The patient would then be evaluated by a medical professional or samples would be taken within the first patient area. There may be a partition 110 between the two areas so as to provide for a division of services provided within the areas, as well as enhance the privacy of the patients, including those alternatives noted above.

The general area 105 not occupied by the patient treatment bays 95 and the cubicles 100 may provide storage area or laboratory space, as needed, and may include one or more sinks. In some embodiments, this area may be used as a pharmacy. The pharmacy may have sufficient pharmaceutical supplies for treatment regimen(s) for up to about four weeks, in some instances up to about three weeks, in other embodiments, up to about one or two weeks. Preferably, there is a plurality of treatment courses so that multiple patients with the same diagnosis can receive appropriate pharmaceuticals in association with treatment or diagnosis at the mobile unit 10. Thus, the unit 10 is able to supply a population or community with necessary medicine during an initial outbreak until longer term medical units arrive in the area. For example, during an influenza epidemic, the pharmacy may be stocked with enough TAMIFLU® (an antiviral medication) to treat the initially infected population, e.g., for about one to three days until additional supplies can be shipped to the mobile unit or a nearby site. Also, in the general area 105 may be one or more medical workstations 115. Alternatively, minor surgical procedures and diagnostics can be performed such as, for example, cervical and other cancer screening, eye and ear examinations, neonatal care, circumcisions, minor and traumatic injury care, nutritional screening, blood testing and analysis, pulmonary diagnosis, tropical medicine care such as screening, diagnosis and treatment of parasitic infections common to local areas, and many others. The workstations 115 may consist of a desk type structure with additional storage space and a work surface. Medical personnel may fill out charts and prescriptions, as well as consult with other personnel at these workstations. Some workstations may be outfitted with a computer for input of medical or epidemiological data.

Figure 5:
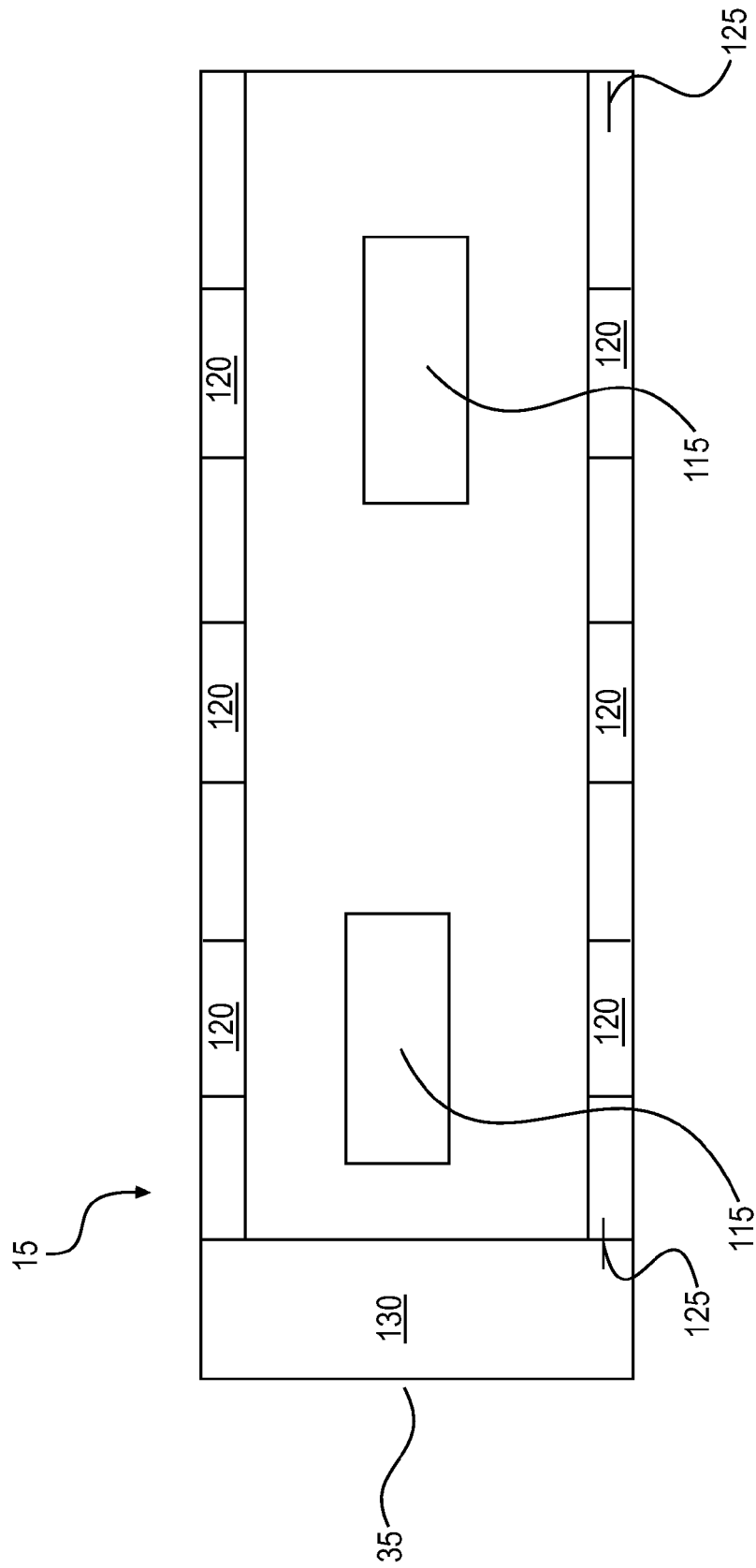
FIG. 5 illustrates a view one embodiment of the invention from the interior of the health care area from the top wherein the health care area is in a first transportable configuration.

As shown in FIG. 5, the workstations 115 may remain in place even when the health care area 15 is in a first contracted configuration. The workstation may be a records database terminal or computer with access to, e.g., a database of treatment procedures, diagnosis information or diagnostic or treatment knowledge base, or patient records, or any combination thereof. Additional equipment at each patient treatment bay 95 or cubicle 100 may include cabinetry for storage 130, which may remain in place or move outward when the health care area 15 is in a second expanded configuration. The unit may also include supply carts for storing and moving supplies. For example, the carts may include airway support supplies, intravenous lines, and treatments for minor laceration and burn care as well as pharmaceuticals. Portable diagnostic machinery, such as ultrasound equipment, may also be provided on the cart.

At one end of the health care area 15 when it is in a first contracted configuration, there may be an entry area 130 in which to store entryway materials such as doors, hydraulic lifts and ramps that can be operatively associated with the mobile unit 10 when in the second configuration. In addition, near the back surface 35 and the surface opposite the back surface 35, there may be sealing flanges 125 for the slide out. The sealing flanges 125 extend generally perpendicular from both the ceiling and side of the slide out and are generally parallel with the side wall 40 of the health care area 15. The sealing flanges 125 facilitate the sealing of the health care area 15 when the slide out 20 is expanded.

Figure 6:
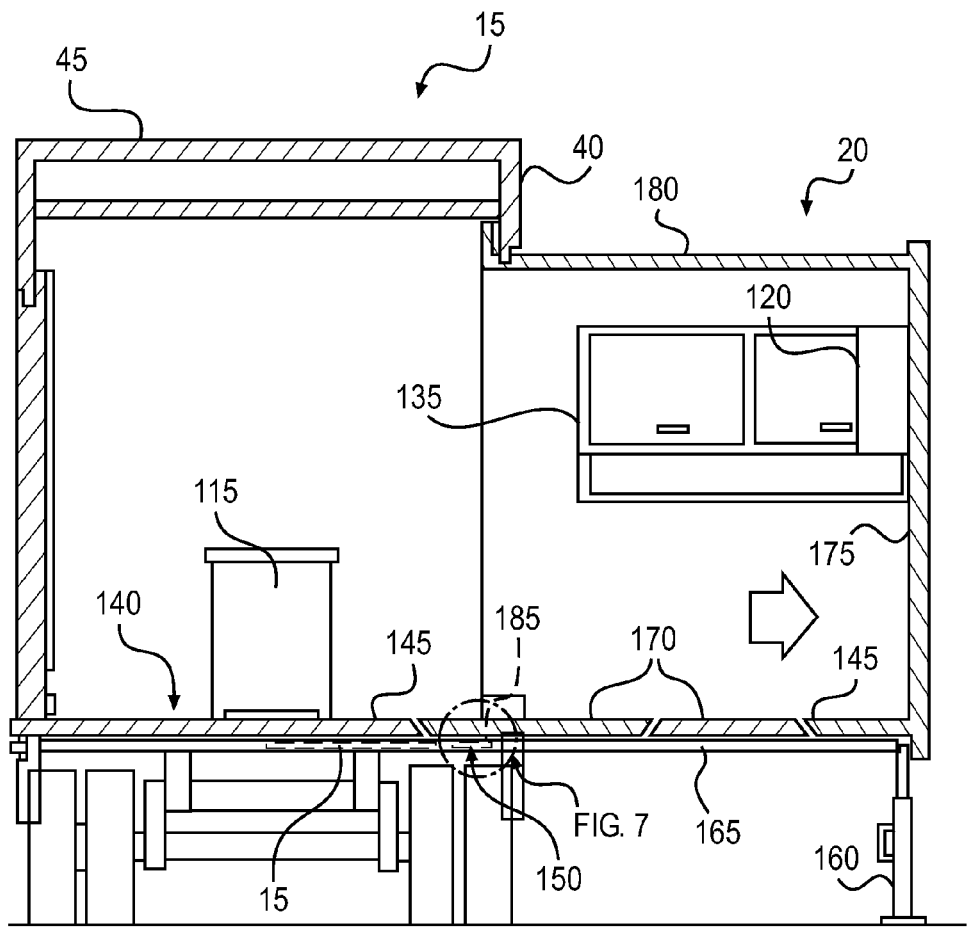
FIG. 6 illustrates a rear view of one embodiment of the invention of the health care area in a second operational configuration.
Figure 7:
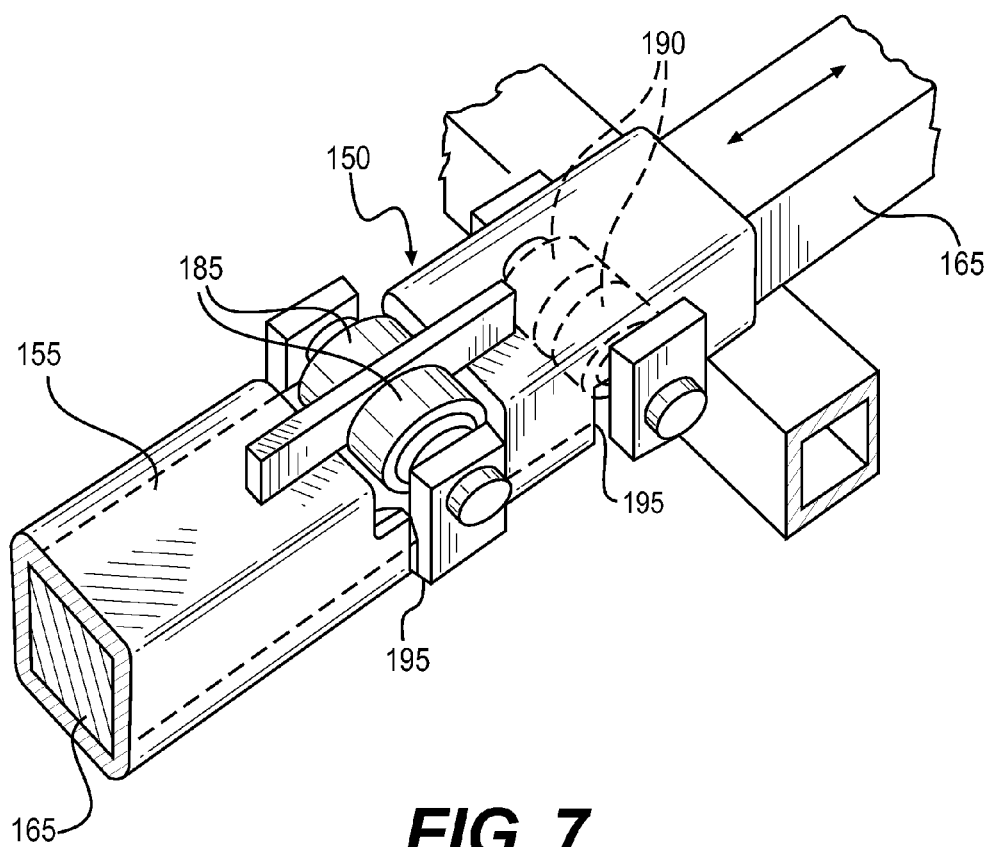
FIG. 7 illustrates an expanded view of a cantilever beam and sleeve as shown in FIG. 6.
Figure 8:
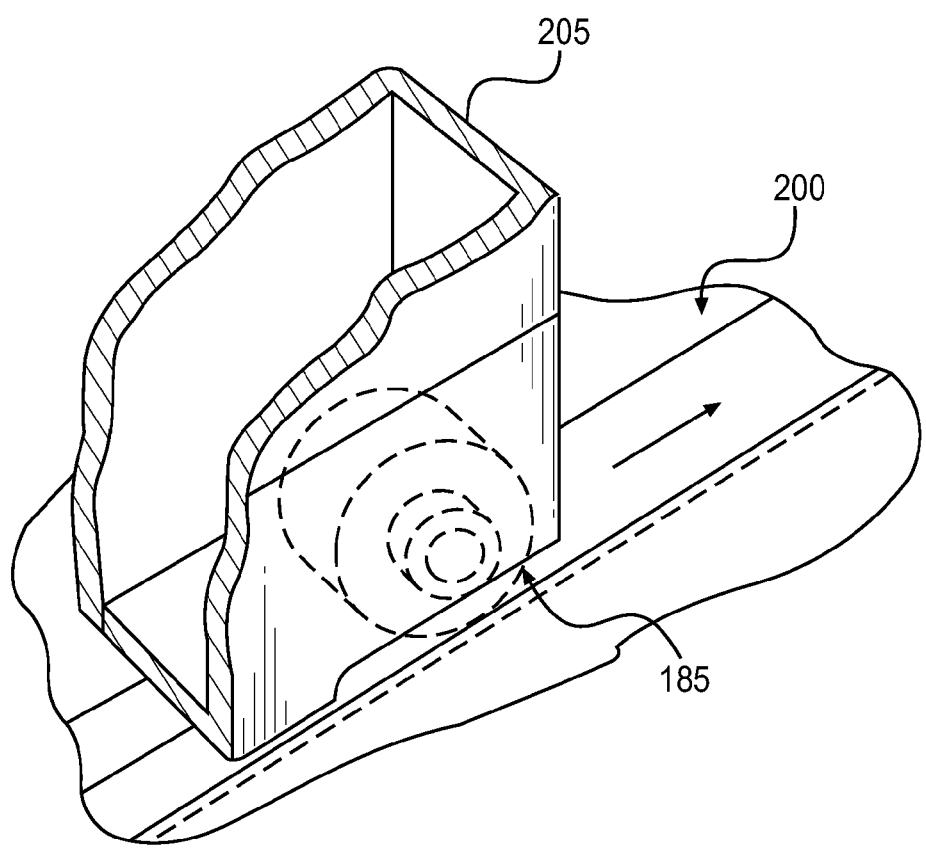
FIG. 8 illustrates an expanded view of a roller area on the bottom of a side end of the slide out that is shown in FIG. 7.

As shown in FIG. 6, the outer wall 175 of the slide out is substantially parallel to the side wall 40 of the health care area 15. Each slide out 40 generally includes an outer wall 175, a ceiling 180 and two connecting walls. The outer wall 175 may be substantially planar with the side wall 40 of the health care area 15. When in a first configuration, the ceiling 180 and two connecting walls are substantially included within the side wall 40. One or more rollers 185 may be affixed to the top of the floor 140 of the health care area 15, e.g., below the slide out 20. The rollers 185, which could be low friction material inserts, tapered or cylindrical or spherical elements (e.g., ball bearings), or the like, can facilitate the movement of the slide out over a floor 140 of the health care area 15 when the slide out 40 is moving between configurations. The movement typically involves sliding the slide out, but could involve rolling or other movement or combinations thereof. The floor 140 of the health care area 15 has several sections that are adjustable to accommodate the slide out 40 movement. For example, the floor 140 between the side walls 40 of the health care area 15 has several sections that can be adapted to fold 170 when the slide out 40 is in the first configuration and several sections that remain solid and do not fold 145, or do not readily fold, when the slide out is in the second configuration. In one embodiment, as shown in FIGS. 9 and 10, two sections of the floor can be adapted to fold up 170 to approximately 90 degrees in the first configuration and to extend to and flatten out to about 180 degrees in the second configuration.

The health care area 15 may include a plurality of hydraulic rams with cylinders and pistons for moving the slide out 20 between configurations. These hydraulic rams may be controlled by a remote control 90, as shown in FIG. 4. Each cylinder can be located between the non-folding floor section 145 and the undersurface 50 of the health care area 15. An end of the piston can be attached to the outer wall 175 of the slide out underneath the floor. One of ordinary skill in the art would appreciate that, although the use of hydraulic rams is exemplified, other methods and devices, such as a rack and pinion gear system, hand cranks or electric motors, actuators, or other such devices or combinations of devices could be used to move the slide out 20 into the different configurations.

The health care area 15 may also include a plurality of structural supports for the slide out 20 when it is in the second configuration. For example, one or more cantilever beams, jack supports, or a combination thereof, may be used. As seen in FIGS. 6 through 9, the health care area 15 may have a plurality of cantilever supports 150. Each support includes a sleeve 155, a beam 165, and one or more rollers 185. The sleeve is typically disposed beneath one of the non-folding floor sections 145 and can be attached to the floor 200 of the health care area 15 and the side end 205 of the slide out 20. The sleeve 155 is able to include some or the entire beam 165. One end of the beam 165 is fixed to the outer wall 175 of the slide out. When the slide out 20 extends out, the beam 165 extends out of the sleeve 155 along with it and when the slide out 20 contracts, the beam 165 can retract back into the sleeve 155 as well. The rollers 185 engage the beam 165 through openings 195 and facilitate the movement of the beam 165 into and out of the sleeve 155. Wires 190 may help control the speed at which the beam extends and contracts. The health care area 15 may also include a plurality of jack supports 160 for additional support to the slide out 20. The jack supports 160 are placed at or near the outer wall 175 of the slide out. The jack supports 160 can be configured to engage one end of the beam 165, although many other configurations could be contemplated by one of ordinary skill in the art.

Figure 9:
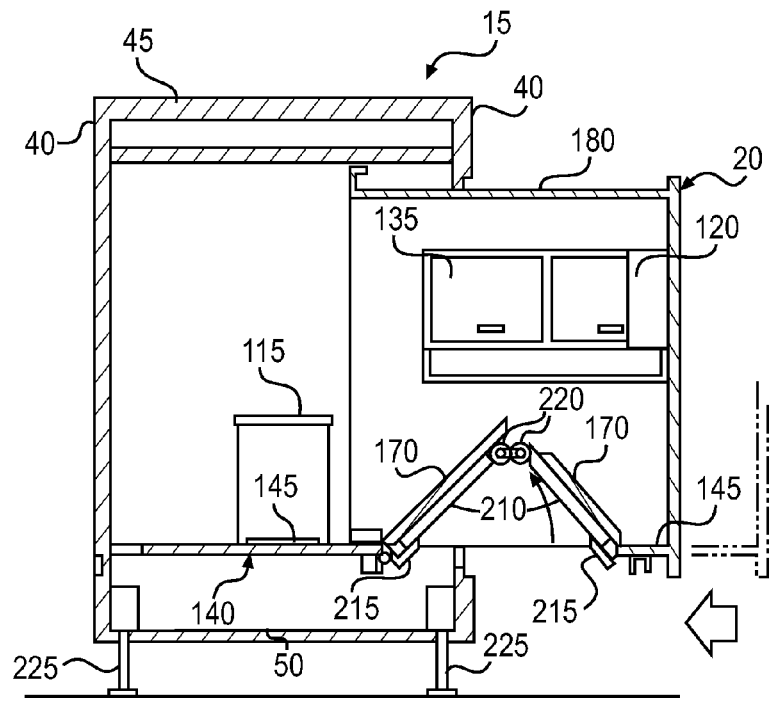
FIG. 9 illustrates a rear view of one embodiment of the invention of the health care area wherein the slide out is between the first and second configuration.
Figure 10:
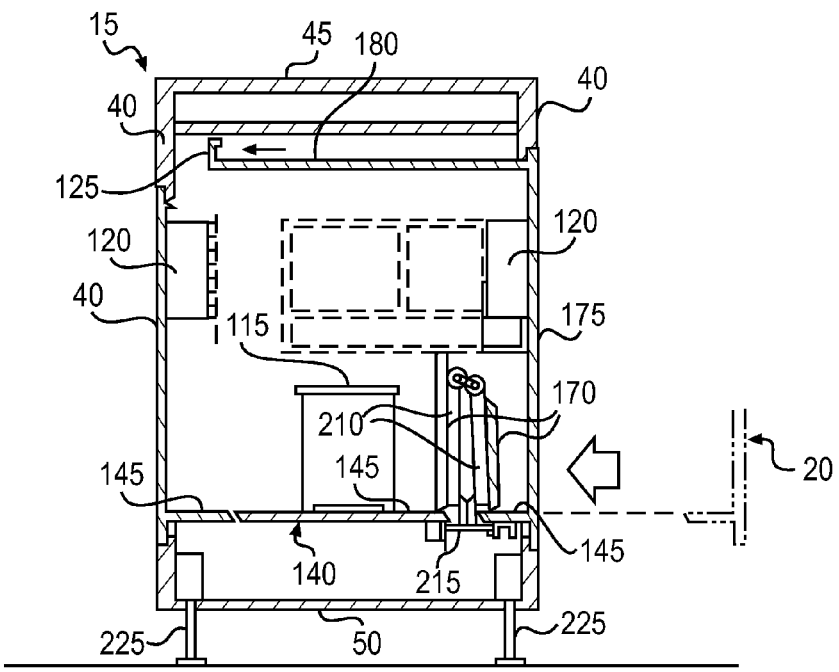
FIG. 10 illustrates a rear view of one embodiment of the invention of the health care area wherein the slide out is in the first transportable configuration.

As shown in FIGS. 9 and 10, a plurality of latitudinal supports 210 can be integrally formed or attach to each folding floor section 170. Each latitudinal support 210 has at least two ends; one adjacent to the folding floor section 170 and one adjacent to the non-folding floor section 145. A bracket, typically U-shaped, 215 connects the at least two ends and allows the folding floor section 170 to rotate or fold upwardly without interference from the non-folding floor section 145. A plurality of stationary gears 220 is attached to the other end of the latitudinal support 210 adjacent to another folding floor section 170. These gears 220 facilitate the movement of the two folding floor sections 170. In addition, the health care area 15 may also be operatively coupled with one or more hydraulic legs 225 adapted to level or stabilize the health care area when it is in the second configuration.

Figure 11:
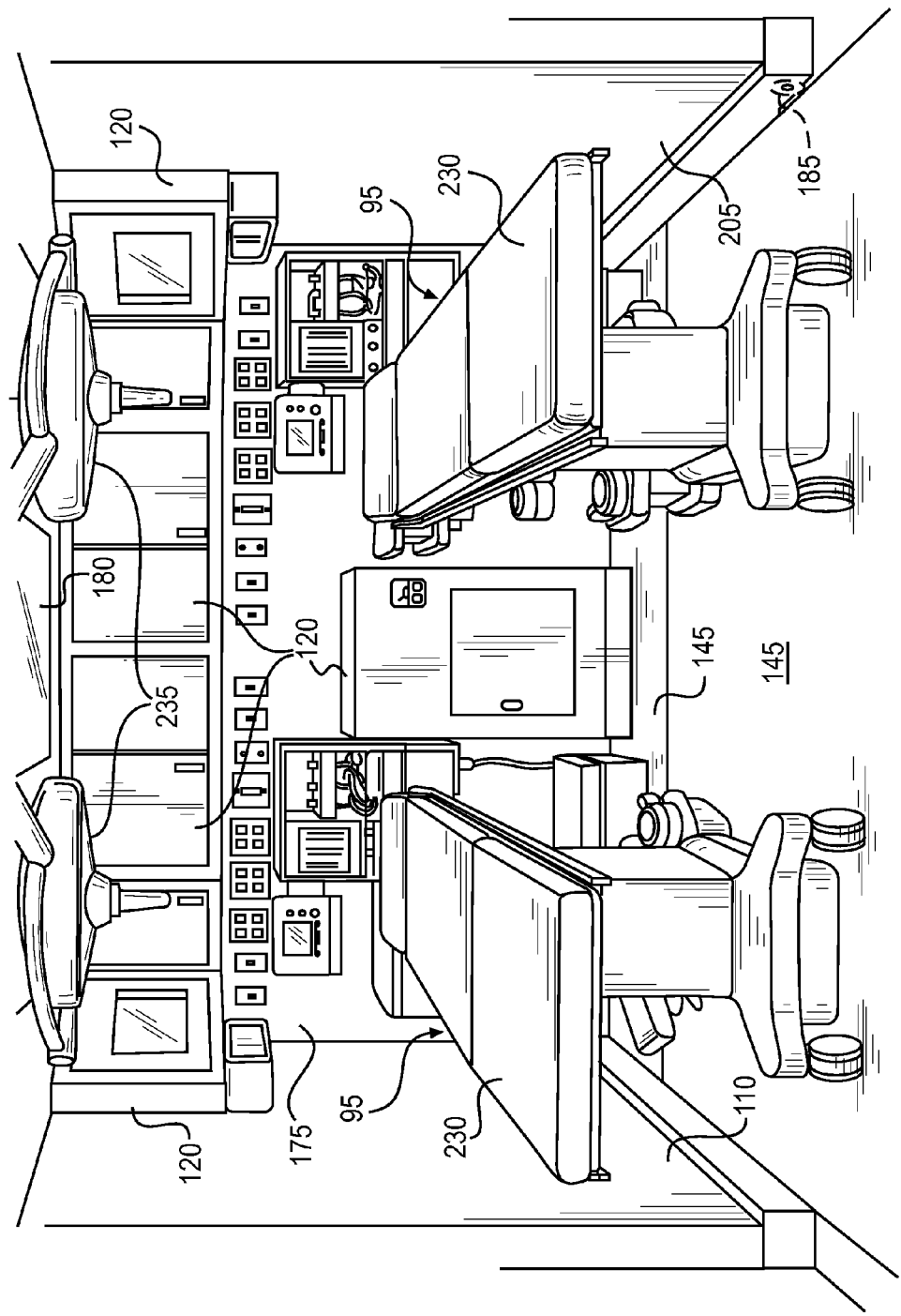
FIG. 11 illustrates a perspective view of one embodiment of the invention of a first medical treatment, diagnostic, and minor surgical procedure patient area defined at least partially by the slide out in a second operational configuration.

As shown in FIG. 11, the patient treatment bays 95 may include hospital litters 230, lighting 235, and supplies that may be stored in a variety of cabinets 120 in each bay 95. The patient treatment bays 95 may also include monitoring and diagnostic equipment. Oxygen, air suction, and electricity can all be piped into the treatment bays 95. The layouts are designed to minimize time between different patients. Diagnostic instruments such as ophthalmoscopes, otoscopes, sphygmomanometers, and thermometers can be found either within the bays 95 or nearby storage areas. Additionally, portable monitors could also be provided. The health care area 20 may also include power generation, running potable water, biohazard waste disposal, heating, air conditioning, and HEPA air filtration.

The mobile treatment, diagnostic, and minor surgical unit 10 may also include an awning system for extending the area and capabilities of the unit 10. The awning system may surround the health care area 15 or the unit 10 in a tent-like manner. A marquee or anchor for the awning system 55 may be placed on top of the health care area 15. A variety of joists and columns preferably made out of aluminum, carbon (nano)composite, or other similarly strong but lightweight material can provide the support for the canvas, or other similarly weather-resistant material that can form a portion of an awning system. Once in place, the awning system can be outfitted with lighting, cooling and heating units. Portable litters may be placed under the awning so as to allow for medical monitoring and basic treatment. Rolling carts with supplies can be provided to aid in the provision of care. If necessary, the awning system provides an effective way of adding additional capacity, particularly when the remote location in which the mobile unit is arranged has a mild climate.

Figure 12:
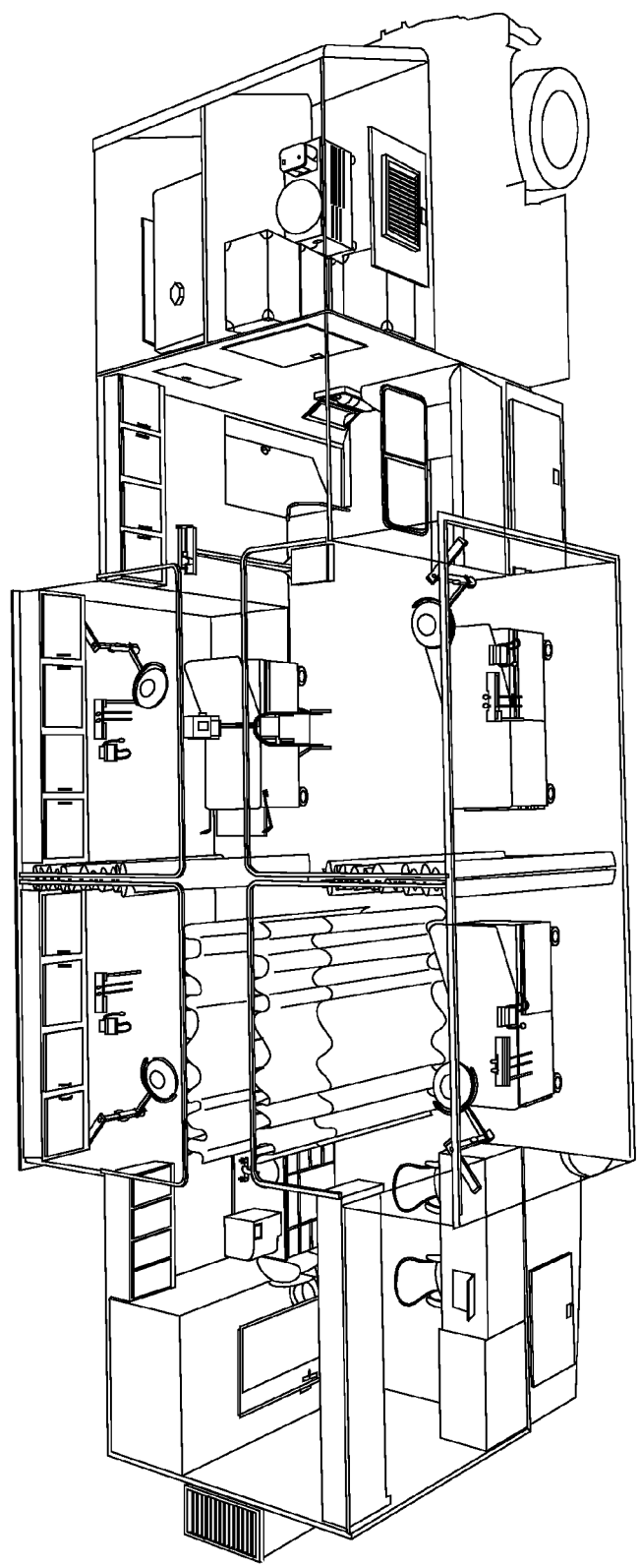
FIG. 12 illustrates perspective view of a mobile facility with a transparent exterior wall showing the interior structures and room placement.

FIG. 12 illustrates a complete mobile facility with a transparent wall showing room placement and the location and design of interior components.

In addition, a method for providing medical care to a plurality of patients in a remote location includes transporting a first health care area in a first transportable configuration from a first location to a second remote location is provided. As used herein "remote location" can include any location that is distant from a community health facility, such as a hospital, a community clinic or, in some instances, a laboratory. In the first configuration the first health care area defines a first floor area and facilitates the transport of the first health care area over one or more roadways. The slide out of the health care area is expanded to expand the health care area into a second operational configuration. The second configuration of the health care area defines a second floor area greater than the first floor area and is adapted to diagnose, treat, and/or perform minor surgery or first aid on a plurality of patients. A first medical treatment, diagnostic, and minor surgical procedure patient area defined at least partially by the slide out within the second floor area is provided as well as a second patient area defined at least partially within the second floor area having at least one region that is for registration, counseling, or triage. Separators for dividing each of the treatment bays may be provided to enhance privacy. The second patient area may include at least one of a table, chair and triage equipment. In some instances, methods can further include contracting the slide out of the health care area back into a first configuration once the immediate need for the services provided by the unit is satisfied. In other instances an awning system may be operably associated with the health care area so as to increase the medical and/or diagnostic capability of the health care area. For example, the awning system may be used where the population in need is large, such as in situations of outbreak or during epidemiological studies.

Other embodiments and uses of the invention will be apparent to those skilled in the art from consideration of the specification and practice of the invention disclosed herein. The term comprising, where ever used, is intended to include the terms consisting and consisting essentially of. Furthermore, the terms comprising, including, and containing are not intended to be limiting. All references cited herein, including all publications, U.S. and foreign patents and patent applications, and the U.S. Provisional Applications noted herein as priority document, are specifically and entirely incorporated by reference. It is intended that the specification and examples be considered exemplary only with the true scope and spirit of the invention indicated by the following claims.

The invention claimed is:

1. A mobile unit adapted to treat, diagnose and operate on multiple patients and adapted for self-propelled transportation, containing:
   a health care area comprising a floor area adapted to interchange between a transport configuration and an operational configuration via a slide out in only one side of the mobile unit, wherein the floor area of the health care area in the transport configuration is reduced compared with the floor area of the health care area in the operational configuration, and wherein the health care area in the operational configuration supports a medical treatment, diagnostic and minor surgical procedure area configured to be able to provide medical care and medical diagnostic facilities to patients and a patient area configured to be able to provide counseling and triage to patients; and
   a transport system coupled to the health care area as a unified structure comprising an engine suitable for transport of the healthcare area, wherein the health care area in the transport configuration is no larger than about 80 percent of the maximum size limit for transportation over a roadway on which the unit is deployed.

2. The mobile unit of claim 1, wherein the health care area includes one slide out area that is adapted to expand and contract the health care floor area and, in the operational configuration, the medical treatment, diagnostic, and minor surgical procedure patient area includes a plurality of patient treatment bays.

3. The mobile unit of claim 2, wherein each patient treatment bay includes either a patient bed or chair and, in the operational configuration, the patient area includes at least one cubicle designed for counseling and triage of the patient.

4. The mobile unit of claim 1, wherein the operational configuration contains at least 50% greater floor area than the transport configuration.

5. The mobile unit of claim 1, wherein the mobile unit is smaller than a semi-trailer truck and the floor area in the operational configuration is at least twice as large as the floor area in the transport configuration.

6. The mobile unit of claim 1, further comprising an awning system configured to be deployed to provide an extended patient care work environment adjacent to one or both sides of the health care area.

7. The mobile unit of claim 1, wherein the unit further comprises:
   a generator sized and dimensioned to provide power to the mobile unit; and
   an air filtration system sufficient to repeatedly filter an air supply to the unit when deployed in the operational configuration, wherein the air filtration system maintains the air pressure inside the unit at a higher level than the air pressure outside the unit to at least minimize contamination in the unit.

8. The mobile unit of claim 1, which comprises wheels, skies, a hull, tracks or a combination thereof.

9. The mobile unit of claim 1, which comprises multiple transport configurations or multiple operational configurations, or multiple transport and operational configurations.

10. The mobile unit of claim 1, wherein the unit further comprises at least one heating source to provide heat to the mobile unit and at least one air conditioning source to cool the unit.

11. A mobile treatment, diagnostic, and minor surgery facility adapted to be transported over a road and to treat a plurality of patients suffering from a range of conditions or injuries comprising:
   a health care area having only one slide out portion;
   a transportable configuration defined by a contracted position of the slide out portion;
   an operational configuration defined by an expanded position of the slide out portion;
   a patient treatment area defined at least partially by the slide out that, when in the operational configuration, is configured to provide general care to a plurality of patients and that includes a row of a plurality of patient treatment bays;
   a patient processing area at least partially defined by the slide out that, in the operational configuration, is adapted to provide registration, counseling, or triage to at least one patient, wherein the slide out portion has a floor area in the operational configuration that is at least twice a floor area when the slide out portion is in the transport configuration; and
   a transport system coupled to the health care area as a unified structure comprising an engine suitable for transport of the healthcare area, wherein the health care area is at most about 80 percent of the maximum size limit for transportation over roadways as determined by a roadway authority.

12. The mobile facility of claim 11, further comprising a fixed awning system that extends outward from the health care area in at least one direction when the health care area is in the operational configuration, and provides an extended patient care work environment adjacent to the health care area.

13. The mobile facility of claim 12, wherein the fixed awning system expands the capabilities of the facility to encompass one or more hospital litters, one or more supply carts, a light source, and an electric source configured to extend one or more of the medical or diagnostic capabilities of the mobile facility, or both, outside of the health care area.

14. The mobile facility of claim 11, wherein the row of the patient treatment bays includes at most six patient treatment bays and the patient processing area includes at least two cubicles for counseling and triage of patients, when the mobile unit is in the operational configuration.

15. The mobile facility of claim 11, wherein the health care area includes a partition between the patient treatment area and the patient processing area to facilitate control of movement between the treatment and processing areas.

16. The mobile facility of claim 11, further comprising contracting the slide out of the health care area to place the health care area back into the transport configuration.

17. The mobile facility of claim 11, further comprising providing one or more separators for dividing each of the treatment bays for privacy therein.

18. The mobile facility of claim 11, which further comprises operably associating an extendable awning system with the health care area to increase the medical or diagnostic capability of the health care area, or both.

19. The mobile facility of claim 11, wherein the patient processing area includes at least one of a table, a chair, and triage equipment.

20. A method for providing medical care to a plurality of patients in a remote location comprising:
   transporting a health care area via a system coupled to the health care area as a unified structure, wherein the health care area is at most about 80 percent of the maximum size limit for transportation over roadways and in the operational configuration contains a greater floor area than the transport configuration, and in the transportable configuration from a first location to a second location, wherein in the transport configuration the first health care area defines a first floor area and facilitates the transport of the health care area over one or more roadways;

expanding a slide out of the health care area to expand the health care area into an operational configuration in only one side of the mobile unit, wherein the operational configuration of the health care area defines a second floor area greater than the first floor area adapted to diagnose, treat, and perform minor surgery or first aid to multiple patients;

providing a first medical treatment, diagnostic, and minor surgical procedure patient area defined at least partially by the slide out within the second floor area; and providing a second patient area defined at least partially within the second floor area having at least one region that is for counseling and triage.

* * * * *